April 2, 1957  A. A. BAKER  2,787,027
ENCLOSED UNITARY PLUMBING FITTING ASSEMBLY
Filed June 2, 1951  2 Sheets-Sheet 2

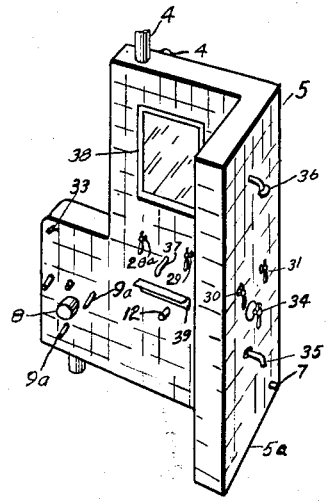

Inventor
ALBERT A. BAKER
By
Florian G. Miller
Attorney

United States Patent Office 2,787,027
Patented Apr. 2, 1957

2,787,027

ENCLOSED UNITARY PLUMBING FITTING ASSEMBLY

Albert A. Baker, Erie, Pa., assignor to J. A. Zurn Mfg. Co., Erie, Pa., a corporation of Pennsylvania Application June 2, 1951, Serial No. 229,572

1 Claim. (Cl. 20—1.11)

This invention relates generally to plumbing fitting assemblies and more particularly to an enclosed unitary plumbing fitting assembly especially designed for installation in a bathroom.

In the installation of piping and fittings in a bathroom in old houses, especially those with solid brick walls, it is necessary to build up false walls to conceal the plumbing. This is very costly and it takes up considerable space. In prefabricated houses, it is difficult to install any appreciable amount of plumbing at the factory so that considerable costly plumbing work must be done on the home site.

It is, accordingly, an object of my invention to provide an enclosed, unitary plumbing fitting assembly having all of the connections and the conventional fittings in a bathroom which is simple in construction, economical in cost, economical in manufacture, and simple and easy to install.

Another object of my invention is to provide an enclosed unitary plumbing fitting assembly with all of the conventional plumbing connections for a bathroom which may easily be installed in an old house without the necessity of building up false walls to conceal the plumbing.

Another object of my invention is to provide a unitary plumbing assembly with conventional connections for bathroom fittings which is portable and which may be installed in prefabricated houses on the home site in a minimum of time.

Another object of my invention is to provide an enclosed unitary plumbing fitting assembly for a bathroom with removable covers so that the pipe connections are easily accessible.

Other objects of my invention will become evident from the following detailed description, taken in conjunction with the accompanying drawings, in which:

Fig. 1 is a perspective view of my novel enclosed plumbing fitting assembly showing spouts for a washbasin and tub, shower head, valves, and other miscellaneous fittings thereon;

Fig. 2 is a plan view of the plumbing fitting assembly shown in Fig. 1 with a bathtub, washbasin, and water closet attached to the fittings;

Fig. 3 is a side elevational view of the assembly shown in Fig. 2;

Fig. 4 is a diagrammatic view of my novel plumbing fitting assembly without the enclosure disposed therearound;

Fig. 5 is a top plan view of the plumbing fitting assembly shown in Fig. 1 with the bathtub assembled lengthwise;

Figures 6, 7:
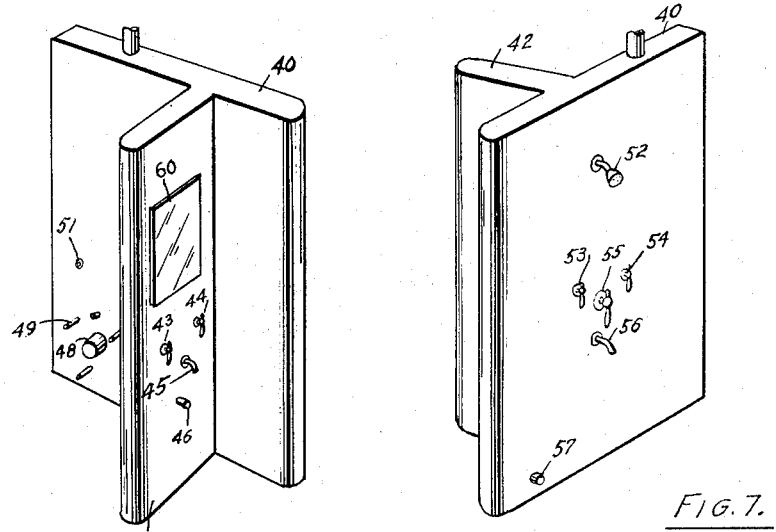
Fig. 6 is a perspective view of a modified form of my novel enclosed plumbing fitting assembly to accommodate a square bathtub.
Fig. 7 is a perspective view of the back side of the plumbing fitting assembly shown in Fig. 6.

Referring now particularly to Fig. 4 of the drawings showing my novel plumbing assembly, I show a drain fitting 1 bent laterally at 2 to form a laterally extending portion and upwardly at 3 forming a stack 4 extending outwardly from the top side of the box-shaped member 5 shown in Figs. 1, 2, and 3. The fitting 1 has a laterally extending aperture 6 in the lower end thereof for connection to a tub drain pipe 7. The pipe 7 extends longitudinally of the member 5 and extends outwardly from the end thereof as shown in Figs. 1 and 3. The fitting 1 and the stack 4 may be made in two sections if this is desired. The fitting 1 also has a laterally outwardly extending branch 8 intermediate thereof for connection to a water closet 9 as shown in Figs. 2, 3, and 5, the branch 8 extending transversely of the member 5 and outwardly therefrom. Water closet mounting studs 9a surround the branch 8 to support the water closet 9. The upper portion 4 of the fitting 1 has a laterally extending bossed aperture 10 for connection to a drain line 11 which in turn is connected to a transversely extending drain pipe 12 for a washbasin 13 by an elbow 14, a nipple 15, and a T 16. A vertically extending pipe 17 is connected to the T 16 and to a T 18 in a horizontally extending back vent pipe 19 which in turn is connected to a bossed aperture 20 in the stack portion 4 of the fitting 1. The tub drain pipe 7 is also connected to the back vent pipe 19 by means of a T 22 in the pipe line 7, a vertically extending pipe 23, and an elbow 24. It will be noted that all of the drain pipes extend longitudinally or vertically in the box-like member 5. The drain lines 7 and 11 have a slight drainage pitch.

Hot water supply pipes 25 and 26 and cold water supply pipes 27 and 28 are provided for the washbasin 13 and bathtub 32, respectively. The cold water supply pipe 28 also provides water for the water closet 9. Suitable valves 28a and 29 and 30 and 31, respectively, are attached to hot water lines 25 and 26 and cold water lines 27 and 28, respectively, for the washbasin 13 and the bathtub 32. A trip valve 33 is also attached to supply line 28 for supplying water for the water closet 9. A conventional mixing valve 34 and a spout 35 leading to the bathtub 32 are provided in my novel unitary plumbing fitting assembly. A conventional spout 37 for the washbasin 13 is also provided. A shower head 36 may be provided if desired. The box-like member 5 has a cabinet 38 disposed therein over a washbasin carrier 39 for supporting a conventional washbasin. A box-like member 5a at right angles to the member 5 has the water supply pipes enclosed therein for the bathtub 32.

It will be evident upon inspection that the enclosed unitary plumbing fitting assembly may be set in a bathroom without any support whatsoever. All of the plumbing and fittings are provided for a conventional washbasin, water closet, and bathtub. It is only necessary to make a drain connection to the lower end of the fitting 1, a stack connection to the upper stack end 4 of the fitting 1, the necessary drain connections to the water closet, washbasin, and bathtub, and connections to the hot water supply pipes 25 and 26 and cold water supply pipes 27 and 28 and the connections are all completed. Washbasin carrier 39 and water closet mounting studs 9a are provided for mounting the washbasin 13 and the water closet 9 in a minimum of time. The bathtub 32 can be installed lengthwise as in Fig. 5 or crosswise as in Figs. 2 and 3 with my novel enclosed plumbing fitting assembly.

Figure 8:
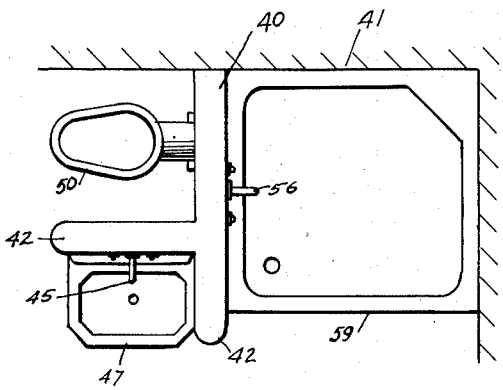
Fig. 8 is a top plan view of the plumbing fitting assembly shown in Figs. 6 and 7 with a water closet, washbasin, and bathtub assembled and connected therewith.

In Figs. 6, 7, and 8, I show another enclosed unitary plumbing fitting assembly in which the end of a box-shaped member 40 is disposed against a wall 41 and it has a right angled, laterally extending, box-shaped portion 42 with hot and cold water valves 43 and 44, a spout 45, and a drain line 46 for connecting a washbasin 47 to the side thereof. A cabinet 60 is disposed over the washbasin 47. The member 40 has a water closet drain connection 48 extending outwardly therefrom, mounting studs 49 therearound for attaching a conventional water closet 50 as shown in Fig. 8, and a trip valve 51. The opposite side of the member 40 has a shower head 52, hot and cold water connections 53 and 54, a mixing valve 55, a spout 56, and a drain 57, for a bathtub 59. In this type of plumbing unit assembly, provision is made for a large sized square bathtub 59 as shown in Fig. 8. All of the fittings and connections for a conventional water closet, washbasin, and bathtub are provided the same as in my enclosed unitary plumbing fitting assembly shown in Figs. 1 to 5 inclusive.

It will be evident from the foregoing description that I have provided a novel enclosed plumbing assembly unit which has means extending therefrom for making all of the drainage and water connections to a water closet, washbasin, and a bathtub, respectively, and also means for mounting a washbasin and water closet. My novel enclosed plumbing fitting assembly may be seated on the floor in a bathroom without any other means of support. It also may be easily removed from a bathroom as a unit. My novel plumbing fitting assembly is inducive to assembly line production and it will provide bathroom connections for the average bathroom at a fraction of the present cost. A medicine cabinet over the washbasin is also provided in my novel assembly.

Various changes may be made in the specific embodiment of my invention without departing from the spirit thereof or from the scope of the appended claim.

What I claim is:

An enclosed plumbing fitting assembly comprising a hollow shell like structure in the form of a section of an L-shaped wall having a top and bottom and side edges, said structure comprising two wall sections disposed at substantially right angles to each other and having a vertically extending drainage fitting in said hollow structure, a branch pipe extending outwardly from said drainage fitting adjacent a lateral edge of one said wall for connection to a water closet, drain lines for a bathtub and for a wash basin connected to the lower portion of said fitting and extending longitudinally thereof with ends extending laterally outwardly therefrom, hot and cold water supply pipes disposed in said hollow assembly, the ends of said water pipes extending outwardly for supplying water to a lavatory and water closet, bathtub, and wash basin, and a stack connection extending from the top of said L-shaped member, a sewer connection extending from the bottom thereof, all said pipes being disposed between the top and bottom of said L-shaped member whereby said L-shaped member may rest on a continuous floor with said sewer connection extending through said floor with the end of said sewer connection adapted to extend down through said floor.

References Cited in the file of this patent

UNITED STATES PATENTS

| | | |
|---|---|---|
| 1,062,008 | Huss et al. | May 20, 1913 |
| 1,145,679 | Grigg | July 6, 1915 |
| 1,282,053 | Donahoe | Oct. 22, 1918 |
| 1,523,947 | Fruin | Jan. 20, 1925 |
| 1,730,547 | Wallace | Oct. 8, 1929 |
| 2,004,933 | Davison | June 18, 1935 |
| 2,266,035 | Hedmark | Dec. 16, 1941 |
| 2,339,778 | Groeniger | Jan. 25, 1944 |
| 2,340,323 | Groeniger | Feb. 1, 1944 |
| 2,419,319 | Lankton | Apr. 22, 1947 |

FOREIGN PATENTS

| | | |
|---|---|---|
| 142,442 | Austria | July 25, 1935 |